April 21, 1970     L. A. HEREDY     3,507,703
ALKALI METAL-AIR HIGH ENERGY-DENSITY FUEL CELL
Filed March 8, 1967
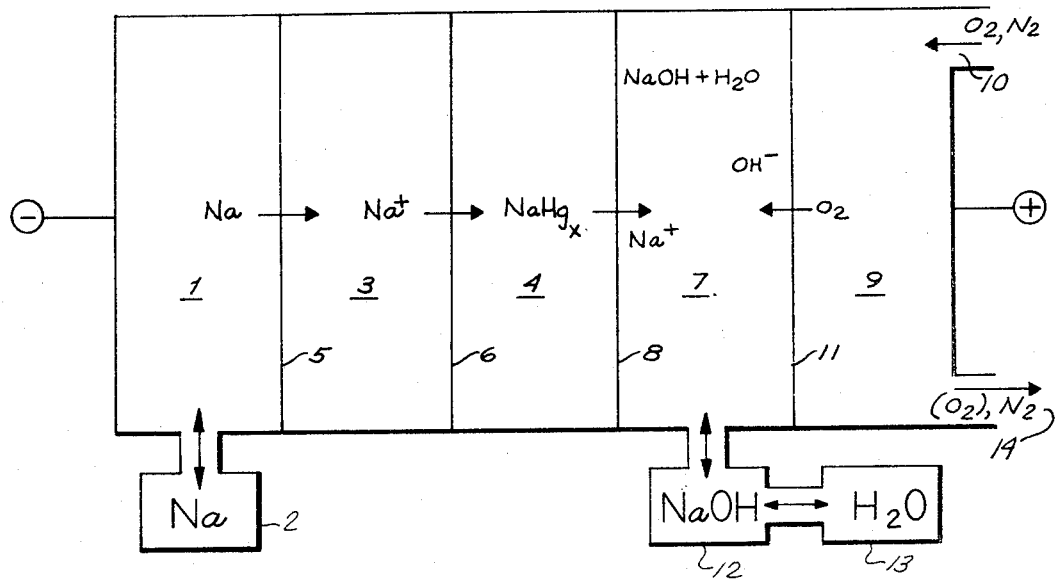
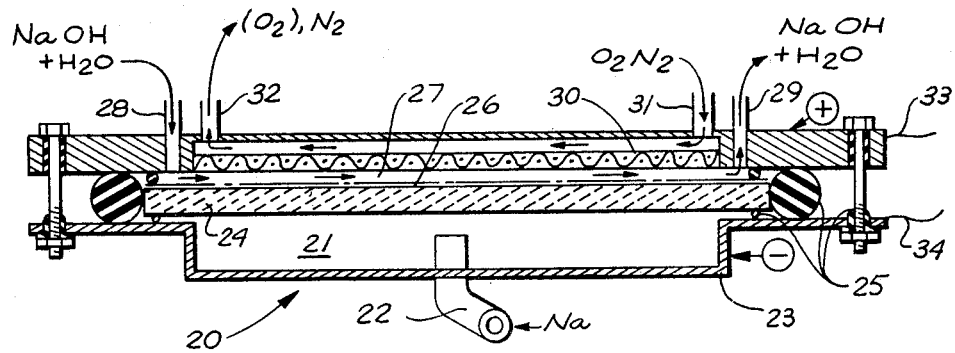
INVENTORS
LASZLO A. HEREDY
BY Henry Kolin
ATTORNEY United States Patent Office
3,507,703
Patented Apr. 21, 1970

3,507,703
ALKALI METAL-AIR HIGH ENERGY-DENSITY FUEL CELL
Laszlo A. Heredy, Canoga Park, Calif., assignor to North American Rockwell Corporation
Filed Mar. 8, 1967, Ser. No. 621,579
Int. Cl. H01m 27/30, 27/20, 27/00
U.S. Cl. 136—86                                             11 Claims

ABSTRACT OF THE DISCLOSURE

A compact, unitary electrically regenerative alkali metal-oxygen fuel cell consisting of a combination of an alkali metal-alkali metal amalgam subcell (using a fusible nonaqueous electrolyte molten below 180° C.) and an alkali metal amalgam-oxygen subcell (using aqueous alkali metal hydroxide solution as electrolyte), the unitary fuel cell being operated at a temperature at which the fusible electrolyte is molten. Exemplary and preferred is a sodium-air cell which contains as nonaqueous electrolyte in the sodium-sodium amalgam subcell an electrolyte fusible below 160° C. consisting of a ternary salt mixture of sodium amide, sodium hydroxide, and sodium iodide.

Cross references to related applications

Various sodium and potassium salt mixtures that may be utilized as molten electrolyte in the practice of this invention are described in "Fusible Alkali-Metal Salt Electrolyte," Ser. No. 621,577 filed Mar. 8, 1967 and assigned to the assignee of the present invention. Reference should be made to this application for fuller details of the sodium and potassium salt mixtures that may be utilized as molten electrolyte in the practice of the present invention.

Background of the invention

This invention relates to improved primary and secondary fuel cells for the direct conversion of chemical energy into electrical energy. More particularly, the invention relates to an electrically regenerative alkali-metal fuel cell having high energy density, power density, and efficiency.

Electric-powered vehicle systems appear very attractive because of their potential for quiet operation, freedom from atmospheric pollution, and low operating costs. However, as a source of electric power, existing secondary batteries, such as the lead-acid and iron-nickel oxide batteries, are limited to special-duty vehicles. These batteries have been precluded from providing the motive power in passenger vehicles because of their low energy density and power density ratios, resulting in impractical weight, volume, and cost requirements. In the search for other systems suitable for use as high-energy, light weight primary and secondary cells, systems employing alkali metals as the anode reactant materials have been studied because of the favorable thermodynamic and physical properties of these metals. However, the vigorous chemical reaction that occurs between an alkali metal and water requires the use of nonaqueous electrolytes in contact with the alkali metal. Two proposed types of nonaqueous electrolytes are solutions of various alkali-metal salts in organic solvents and fusible alkali-metal salts. Thus, in one fixed-plate secondary cell using a lithium anode and copper fluoride cathode, the electrolyte consists of a solution of $NaPF_6$ in propylene carbonate. In another system operating as a continuous feed fuel cell, lithium is fed as the anode material and chlorine is fed as the cathode material, molten LiCl serving as the electrolyte.

A fuel cell using an alkali metal as anode material and oxygen as cathode material is of interest since air, which is a convenient source of oxygen, is continuously available from the atmosphere, thereby eliminating storage requirements for the cathode reactant. Just as the direct single-step electrochemical oxidation of an alkali metal to obtain electrical energy is not feasible in an aqueous electrolyte because of the rapid reaction of the alkali metal with water, single-step oxidation in a cell with a nonaqueous electrolyte presents formidable problems because of the requirements that the electrolyte be chemically compatible with both the alkali metal and oxygen and that the oxygen electrode be operable in this nonaqueous electrolyte. In addition, if the fuel cell were also to be operated as a secondary cell, the regeneration of formed alkali metal oxide would require solution.

Because amalgamated alkali metal is much more stable in an aqueous electrolyte than the alkali metal itself a primary fuel cell based on the oxidation of sodium in sodium amalgam has been proposed in U.S. Patent 3,161,546. Further, in order to utilize the energy of the reaction between sodium and mercury, which would be dissipated as heat if the sodium and mercury were first directly amalgamated by mixing, it has also been proposed that a sodium-mercury electrochemical cell be set up with the sodium serving as the anode, the mercury as the cathode, and a nonaqueous electrolyte therebetween, as shown in U.S. Patent 3,057,946. The fuel cell system shown in this patent functions essentially as a primary type of fuel cell and utilizes two separate cells, necessitating the use of interconnecting conduits, pumping equipment, and heat exchange equipment. Such a system would be difficult to operate as an electrically regenerative secondary cell, and would also have a relatively low energy density because of its lack of compactness and the requirements for a high inventory of mercury and associated conduits, pumps, and heat exchange equipment.

Summary of the invention

It is an object of this invention to provide a compact, high-power-density unitary alkali metal-oxygen primary or secondary fuel cell wherein the entire cell is maintained and operated at the same temperature below 190° C. A preferred embodiment of such a cell is considered to be particularly suitable for providing electric power for electrically driven vehicles.

In accordance with the broad aspects of this invention, a compact, isothermal alkali metal-oxygen fuel cell that is electrically regenerable is provided consisting of a unitary structure in which a molten alkali metal selected from sodium, potassium and mixtures thereof serves as anodic material, an oxygen source is utilized as cathodic material, and a mercurial layer consisting of mercury or alkali metal amalgam is disposed between the anodic and cathodic materials, and functions therewith as a bipolar interelectrode.

In a first subcell of the unitary fuel cell, the alkali metal is electrochemically converted to a dilute alkali metal amalgam using a high electrical conductivity, low-melting molten salt of the alkali metal as electrolyte; in a second subcell, the alkali metal amalgam is electrochemically oxidized with oxygen, preferably provided by air, to convert the alkali metal thereof to its hydroxide, an aqueous solution of the alkali metal hydroxide serving as electrolyte. The operations in the two subcells occur simultaneously, and are carried out in the compact, unitary fuel cell of this invention at a temperature below about 190° C., i.e., about ten degrees above the melting point of the molten alkali-metal salt electrolyte, or as close thereto as feasible. For the nonaqueous electrolyte, low-melting, high-conductivity alkali-metal inorganic or organic salts may be utilized, particularly those containing an alkali metal amide or an organic-substituted amide of the alkali metal as essential component. In the preferred aspects of this invention, utilizing a fusible sodium salt electrolyte having a melting point of about 127° C., the operating temperature of the cell may be maintained at about 135° C. The low-melting alkali-metal salt electrolyte used in the first subcell will be in the molten state at the temperature of operation of the fuel cell. Generally, its melting point will be several degrees below the cell operating temperature.

In its preferred aspect, the invention is directed to an electrically regenerative fuel cell utilizing oxygen from air and sodium as respective cathode and anode reactant materials. Preferably, the nonaqueous electrolyte used in the first subcell of this fuel cell consists of a ternary mixture of sodium amide, sodium hydroxide, and sodium iodide.

Brief description of the drawings

FIG. 1 is a diagrammatic representation of the cell reactions that occur in a preferred embodiment of the electrically regenerative cell of this invention.

FIG. 2 is a schematic representation, partly in cross section, of a unitary electrically regenerative cell of this invention.

Description of the preferred embodiments

In practicing the present invention in its broadest aspects, the overall chemical reaction which occurs is the oxidation of an alkali metal selected from sodium, potassium, and sodium-potassium mixture to the corresponding alkali metal hydroxide. To obtain electrical energy from this reaction, it is carried out electrochemically. For convenience in understanding this reaction, it may be considered as occurring in two steps. In the first step, the molten alkali metal is electrochemically converted to a dilute alkali metal amalgam in a first subcell using a low-melting molten salt of the alkali metal as electrolyte. In the second step, the alkali metal contained in the alkali metal amalgam is oxidized to its hydroxide in a second subcell, an aqueous solution of the alkali metal hydroxide serving as the electrolyte.

Where molten potassium is used as the anode material, mixed potassium salt molten below 180° C., e.g., a ternary mixture containing, in mole percent (m/o), 30–50 potassium amide, 20–35 potassium hydroxide, and 30–50 potassium iodide, is used as nonaqueous electrolyte in the first step; an aqueous solution of potassium hydroxide is then used as aqueous electrolyte in the second step. A particularly preferred potassium salt electrolyte contains 36±2 m/o KNH$_2$, 27±2 m/o KOH, and 37±2 m/o KI and has a melting point of 171° C. Sodium-potassium (NaK) mixtures are also of interest as anode reactant material because of their low melting temperatures, mixtures which contain between 40 and 89 weight percent potassium being molten at room temperature. Suitable low-melting nonaqueous electrolytes that may be used with a NaK system are the NaNH$_2$—KNH$_2$ binary salt eutectic (M.P. 93° C.), described by C. A. Krause and E. G. Cuy in J. Am. Chem. Soc. 45, 712–715 (1923), and a mixed-salt composition of the amide, hydroxide, and iodide of sodium and potassium.

Of the alkali metals K, NaK, and Na, sodium is preferred for use as the anodic fuel because of its lower cost and ready availability, its lower equivalent weight, and the simplicity involved in dealing with a single cationic species. Oxygen as the cathode reactant material is conveniently provided by air from the atmosphere, thereby eliminating storage requirements. The preferred fuel cell of this invention is therefore that employing molten sodium as anodic reactant material and oxygen, provided by air, as cathodic reactant material. In the first subcell of this preferred fuel cell, a suitable and preferred low-melting electrolyte fusible below 160° C. is the ternary salt system containing, in mole percent (m/o), 30–78 sodium amide, 20–60 sodium hydroxide, and 1–20 sodium iodide. Particularly preferred is the eutectic mixture containing 52±2 m/o NaNH$_2$, 38±2 m/o NaOH, and 10±2 m/o NaI, which has a melting point of about 127° C. and a relatively high molten-state conductivity of 0.28 (ohm-cm.)$^{-1}$ at 130° C. This electrolyte and other suitable ones are more fully described in copending application S.N. 621,577, which should be referred to for further details.

The practice of this invention will therefore be exemplified by reference to a preferred embodiment thereof utilizing a sodium fuel, shown in FIGS. 1 and 2 of the drawings.

Referring to the diagram of FIG. 1, wherein the reactions which occur in the fuel cell are shown in a schematic manner, and considering the electrical discharge phase of cell operation, sodium is shown as supplied continuously to an anode compartment 1 from a sodium reservoir 2. A molten salt electrolyte is present in an electrolyte compartment 3, the molten salt preventing direct contact between the sodium in compartment 1 and sodium amalgam present in compartment 4. When the sodium contacts the molten salt at the sodium-molten electrolyte interface 5, it forms sodium ions and electrons. Simultaneously, sodium ions equivalent in amount discharge at a molten electrolyte-amalgam interface 6 to form sodium amalgam in compartment 4. The net result of these reactions, which may effectively be considered as taking place in a first subcell, is the electrochemical transfer of sodium from the sodium anode compartment 1 into the amalgam in compartment 4. The amalgam region also serves to separate the molten salt electrolyte in compartment 3 from the aqueous sodium hydroxide electrolyte in a compartment 7. The sodium discharged at interface 6 diffuses through the sodium amalgam region and ionizes at an amalgam-aqueous electrolyte interface 8, forming sodium ions and electrons.

The amalgam region may be characterized as a bipolar interelectrode, acting simultaneously as both the cathode of the molten salt electrolyte subcell (first subcell) and the anode of the aqueous electrolyte subcell (second subcell). The net process which takes place in the amalgam region is the migration of sodium (as NaHg$_x$, or solvated sodium) across the amalgam, by diffusion under the driving force of a concentration gradient and by convection. The cell reactions which occur during discharge at interfaces 5, 6, and 8 may be represented, respectively, as follows:

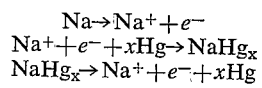

A cathode compartment 9 contains an oxygen-containing gas, which may be pure oxygen or air (O$_2$, N$_2$), which is admitted through an opening 10. While the use of pure oxygen, compared with air, is advantageous in providing a higher current density at the cathode, storage facilities for the pure oxygen would then be required. Where air is used, a fraction of the oxygen content of the air, approximately half, is reduced electrochemically at the aqueous NaOH-oxygen-air electrode interface 11 to form hydroxyl ions. These combine with the sodium ions, formed at the amalgam-electrolyte interface 8, to produce an aqueous NaOH solution. This solution is kept in circulation through the cell and an aqueous electrolyte storage reservoir 12. The NaOH concentration (preferably between 50 and 70 wt. percent) is preferably kept relatively constant by the addition of water from a water storage reservoir 13 at a rate proportional to the rate of NaOH formation. Depleted air, shown as (O$_2$), N$_2$, is removed from the system at an opening 14.

When the reactants are electrically regenerated during the recharge phase of cell operation, electrolysis of the aqueous NaOH solution is performed in the second subcell region of the fuel cell. Sodium is deposited at the amalgam-aqueous electrolyte interface 8, and oxygen is generated at the air electrode interface 11. The concentration of the aqueous NaOH electrolyte is kept substantially constant during the electrolysis by evaporating water from the electrolyte at a rate proportional to the rate of the electrolysis. The evaporated water is condensed and returned to the water storage reservoir 13. Simultaneously, in the first subcell region sodium is transferred electrolytically from the amalgam electrode interface 6 through the molten salt electrolyte in compartment 3 into the sodium electrode compartment 1, regenerated sodium being returned to sodium storage reservoir 2. For a fuel cell requiring a lower total energy content (watt-hours) and a more compact construction, externally shown reservoirs 2, 12, and 13 may be incorporated within the interior portions of the cell.

In FIG. 2 is shown a cross-sectional view of a preferred embodiment of a compact, electrically regenerative sodium-air fuel cell, in accordance with this invention, in which the two subcells of the fuel cell are housed together in the same unit in isothermal relation with one another, the entire fuel cell being operated at substantially the same temperature below about 170° C. and at least as low as about 135° C. under optimum conditions. This unitary arrangement of the subcells eliminates any requirement for circulating amalgam between two separate cells with associated conduits, pumps, and heat exchangers, thereby considerably simplifying cell construction. The relatively low temperature of operation also permits the use of inexpensive lightweight plastics as construction materials not ordinarily available for use at elevated temperatures. Compared to previously proposed alkali metal-amalgam-oxygen cells in which one of the fuel cell units must be operated at temperatures above 230° C. and a circulating amalgam electrode is required, the present unitary cell arrangement, using a much lower and uniform operating temperature and employing a localized amalgam intermediate electrode, thereby reducing the weight of mercury and the cost of the system, is a simpler and more efficient way of providing electrical energy and makes realizable a fuel cell having high energy density and power density.

Referring to FIG. 2, the fuel cell 20 may be considered as consisting of two subcells, a first sodium-sodium amalgam subcell and a second sodium amalgam-oxygen subcell, although the separate identities of the two subcells are merged in actual operation. In the first subcell, sodium is supplied to a sodium anode compartment 21, by way of an inlet tube 22, which is connected to a sodium storage vessel (not shown). The outer wall 23 of the anode compartment is made of a suitable nonreactive conductive material, such as stainless steel, or of a nonconductive plastic material with a metallic lead therethrough. This outer wall 23 is insulated from a molten salt electrolyte matrix 24 by suitable O-rings 25 made of a material such as rubber. The molten salt matrix 24 is made of a suitable material such as porous beryllia or alumina ceramic and is impregnated with a low-melting molten sodium salt electrolyte, preferably the eutectic composition of the ternary salt mixture $NaNH_2$-NaOH-NaI, which has a melting point of about 127° C.

The amalgam electrode is preferably in the form of a foamed metal screen 26 impregnated with sodium amalgam. This provides a localized amalgam layer that is common to the two subcells and serves as a fixed bipolar interelectrode, functioning as the cathode of the first subcell and anode of the second subcell. It is made as thin as possible, to provide maximum reduction in cost and weight of the cell, consistent with the amount of amalgam required to separate the molten and aqueous electrolyte layers.

A solution of sodium hydroxide is continuously recirculated, entering the aqueous electrolyte compartment 27 of the second subcell by way of an opening 28 and exiting from the cell by way of an opening 29. The oxygen electrode 30 of the cell consists of an active metal screen, e.g., a platinum-activated nickel screen or other catalyzed porous metallic layer, over which there is a continuous flow of an oxygen-containing gas, e.g., pure oxygen or in diluted form such as air, which enters the cell at an opening 31 and leaves the cell in a depleted state by way of an opening 32.

In operation of the cell during the discharge phase, sodium is supplied continuously to the anode compartment and ionizes at the sodium-molten salt interface to form sodium ions and electrons. Simultaneously, sodium ions in equivalent amount discharge at the molten salt-amalgam interface to form sodium amalgam. The discharged sodium diffuses through the sodium amalgam layer and ionizes at the amalgam-aqueous electrolyte interface forming sodium ions and electrons. At the cathode, the oxygen in the air supplied to it is reduced electrochemically to form hydroxyl ions. These combine with the sodium ions formed at the amalgam-aqueous electrolyte interface to produce an aqueous NaOH solution. Electric current is obtained from the cell during the discharge phase by means of separate leads 33 and 34 which are connected, respectively, to the cathode and anode sections of the cell, which are suitably insulated from each other.

When the reactants are regenerated during the recharge phase of the cycle, electric current is provided to the cell by way of leads 33 and 34. Electrolysis of the aqueous NaOH solution then occurs, sodium being deposited at the amalgam-aqueous electrolyte interface and oxygen being generated at the air electrode. Simultaneously, sodium is transferred electrolytically from the amalgam layer to the sodium electrode compartment, recovered sodium being returned to a sodium storage tank (not shown).

The following examples, which are illustrative only and are not to be construed as limiting the invention describe operation of a unitary molten sodium-air cell.

EXAMPLE 1

A cell constructed essentially in accordance with the design illustrated in FIG. 2 was employed. The sodium electrode had an area of 13.2 sq. cm., the amalgam electrode consisted of a 60% density, 55-mil-thick foamed metal screen impregnated with 40.8 gm. of 2.0 atom percent sodium amalgam. The fused salt-amalgam screen interfacial area was 11.4 sq. cm., with the amalgam-aqueous sodium hydroxide interfacial area being 3.94 sq. cm. The oxygen electrode was a standard type of fuel cell electrode consisting of platinum black on a 70-mesh nickel screen and having an area of 5.07 sq. cm. The oxygen electrode-amalgam distance was approximately 1 cm. The fused salt electrolyte consisted of the eutectic mixture of the ternary mixed salt of $NaNH_2$-NaOH-NaI, having a melting point of 127° C. The aqueous electrolyte used was 100 ml. of 50% NaOH.

The cell was operated for 7 hours at a temperature of about 135° C., a continuous flow of air being used to provide the supply of oxygen. The maximum current drawn was 280 ma. A power of 0.5 watt was drawn at 1.8 volts output. After sufficient current was drawn to insure that sodium had been transported from the sodium electrode to form sodium hydroxide, the system was recharged and discharged for several cycles, thereby demonstrating the electrical regeneration of the cell.

EXAMPLE 2

A cell providing a 1.0 watt nominal output at 50 ma./cm.$^2$ current density was constructed essentially in accordance with the design used in Example 1. The sodium was contained in a polypropylene compartment. The molten salt electrolyte matrix consisted of a porous ceramic impregnated with a molten salt which was a eutectic mixture of the ternary mixed salt of $$NaNH_2\text{-}NaOH\text{-}NaI$$

The amalgam electrode was 0.5 mm. thick. A high temperature fluorinated polymer was used for the aqueous sodium hydroxide and air compartments, the air electrode consisting of a gold-coated nickel screen with a porous fluorinated polymeric backing. The screen contained 9 mg./cm.$^2$ of dispersed platinum catalyst. The active surface area of each of the electrodes was 8 sq. cm. The following shows typical results obtained at an operating temperature between 128 and 136° C. for more than 100 hours of operation.

| Operating mode | Cell voltage (v). | Current density (ma./cm.$^2$) | Power density (mw./cm.$^2$) |
| --- | --- | --- | --- |
| Open circuit | 2.60 | | |
| Discharge | 2.42 | 20 | 48.4 |
|  | 2.35 | 50 | 117.5 |
|  | 2.30 | 70 | 161.0 |
| Charge | 3.30 | 20 | |
|  | 3.38 | 50 | |

While specific materials of construction have been utilized and described in conjunction with a preferred embodiment of the fuel cell, it will be obvious that other equivalent materials may also be used in accordance with the principles of the present invention. Further, particular features of construction of the fuel cell shown herein may be readily modified in accordance with specific energy requirements. Thus, to provide a more compact fuel cell having a lower total energy requirement, the fuel cell embodiment shown in FIG. 2 may be altered to incorporate the sodium and aqueous sodium hydroxide storage vessels within the fuel cell structure itself.

Furthermore, while the unitary fuel cell of this invention is operable at a temperature below 190° C. and above the melting points of the alkali metal and of the fusible salt electrolyte, the actual temperature of operation will generally and preferably be as low as feasible within this temperature range. Thereby, loss of mercury, corrosion and contamination problems, high internal cell pressure, and cell warm-up time requirements will be minimized or eliminated.

It will, of course, be understood that while the fuel cell of the present invention is of principal interest as a secondary cell which is electrically regenerable, it may also be used as a primary cell. Also, while a single fuel cell unit has been illustrated and described, a rechargeable battery assembled from many such cells will be used for an electric-powered vehicle. By the terms high energy density, high power density, and high efficiency, values of at least 100 watt-hrs./lb., 25 watts/lb., and 50% of the output-to-input ratio of electrical energy, respectively, are contemplated. Substantially higher values than these minimal ones are realizable for fuel cells and batteries made in accordance with the present invention. In general, a battery providing an energy density greater than 150 watt-hr./lb. and a power density greater than 35 watts/lb. is considered to be potentially competitive with a gasoline-powered internal combustion engine for passenger motor vehicle applications. Analysis of the preferred sodium-air system, based on a multicell battery providing an output of 20–40 kilowatts, which would offer performance about equivalent to that provided by an internal combustion engine of about 50–100 horsepower S.A.E., shows that the preferred sodium-air system of this invention could provide an energy density for the complete system of about 180 watt-hr./lb. for 4 hours continuous operation. A power density of 50 watts/lb. would be provided at the operating voltage of the average required power level of the duty cycle. In addition to an electrically powered car being potentially quieter and smog-free, the expected cost of electrical energy required could be about one-half that of the gasoline used for an internal combustion engine of the same performance.

While the preferred embodiments of the electrically regenerable fuel cell of the present invention and its principle of operation have been illustrated and described, it should be understood that within the scope of the appended claims the invention may be practiced otherwise than as specifically illustrated and described.

I claim:
1. A unitary, high-power-density electrically regenerable fuel cell utilizing oxygen and an alkali metal selected from sodium, potassium and mixtures thereof as fuel and operable at a uniform cell temperature below 190° C. and above the melting point of the alkali metal during discharge and charge cycle comprising, in combination,
   (a) a first subcell having an anode compartment containing said alkali metal molten at cell operating temperature as anode, a cathode compartment containing an amalgam of said alkali metal as cathode,
       and an electrolyte compartment between said anode and cathode compartments containing a salt of said alkali metal fusible at a temperature below 180° C. and molten at cell operating temperature as electrolyte,
   (b) a second subcell contiguous to said first cell and having a cathode compartment containing an oxygen-supplying material as cathode, an anode compartment containing an amalgam of said alkali metal as anode,
       the cathodic amalgam of the cathode compartment of the first subcell also serving as the anodic amalgam of the anode compartment of the second subcell,
   and an electrolyte compartment between the anode and cathode compartments of the second subcell containing an aqueous hydroxide solution of said alkali metal as electrolyte, and
   (c) separate means connected to the alkali metal and oxygen electrodes for electrically discharging and charging said cell.

2. A fuel cell according to claim 1 wherein said alkali metal is sodium and said oxygen-supplying material is air.

3. A fuel cell according to claim 1 wherein said alkali metal consists of a mixture of sodium and potassium and the molten electrolyte is a binary mixture of sodium amide and potassium amide.

4. A fuel cell according to claim 1 wherein said alkali metal is potassium and the molten electrolyte is a ternary mixture of potassium salts containing, in mole percent, 30–50 potassium amide, 20–35 potassium hydroxide, and 30–50 potassium iodide.

5. A fuel cell according to claim 4 wherein the ternary mixture contains, in mole percent, 36±2 potassium amide, 27±2 potassium hydroxide, and 37±2 potassium iodide.

6. A fuel cell according to claim 1 operable at a temperature below 170° C. wherein said alkali metal is sodium.

7. A fuel cell according to claim 6 wherein the molten electrolyte is fusible below 150° C. and is a ternary mixture of sodium salts containing, in mole percent, 30–78 sodium amide, 20–60 sodium hydroxide, and 1–20 sodium iodide.

8. A fuel cell according to claim 7 wherein the ternary mixture contains, in mole percent, 52±2 sodium amide, 38±2 sodium hydroxide, and 10±2 sodium iodide.

9. A unitary, high-power-density electrically regenerable fuel cell operable at a temperature below 170° C. utilizing an oxygen-containing gas and sodium as fuel comprising, in combination,
   (a) a sodium electrode compartment containing a sodium layer molten at cell operating temperature,
   (b) a porous nonconducaive matrix having a first surface disposed in contact with said sodium layer,
       said matrix containing a fusible sodium salt electrolyte molten at cell operating temperature,
   (c) a bipolar interelectrode consisting of a sodium amalgam layer having a first surface disposed in contact with an opposite surface of said matrix, (d) a layer of an aqueous sodium hydroxide solution having a first surface in contact with an opposite surface of said amalgam layer,
(e) an oxygen electrode consisting of
    (1) an active metal porous layer having a first surface in contact with an opposite surface of the aqueous sodium hydroxide layer and
    (2) a layer of oxygen-containing gas in contact with an opposite surface of said active metal porous layer and in contact with said opposite surface of the aqueous sodium hydroxide layer, and
(f) electrical lead means separately connected to the sodium and oxygen electrodes for electrically discharging and charging said cell.

10. A fuel cell according to claim 9 wherein the molten electrolyte is fusible below 160° C. and is a ternary mixture of sodium salts containing, in mole percent, 30–78 sodium amide, 20–60 sodium hydroxide and 1–20 sodium iodide.

11. A fuel cell according to claim 10 wherein the fusible sodium salt electrolyte is a ternary mixture containing, in mole percent, $52\pm2$ sodium amide, $38\pm2$ sodium hydroxide, and $10\pm2$ sodium iodide.

References Cited

UNITED STATES PATENTS

| | | | |
|---|---|---|---|
| 2,921,110 | 1/1960 | Crowley et al. | 136—86 |
| 3,057,946 | 10/1962 | Eidensohn | 136—86 |
| 3,245,836 | 4/1966 | Aguess | 136—86 X |

ALLEN B. CURTIS, Primary Examiner

U.S. Cl. X.R.

136—154